United States Patent
Bonzagni et al.

(10) Patent No.: US 7,374,041 B2
(45) Date of Patent: May 20, 2008

(54) FLEXIBLE STORAGE DEVICE THAT FITS OVER (OR IS ADHERABLE TO A SURFACE OF) THE LID OF A PORTABLE COMPACT DISK PLAYER FOR RECEIVING AND STORING COMPACT DISKS AND PORTABLE COMPACT DISK PLAYERS EMPLOYING SAME

(76) Inventors: Michael D. Bonzagni, 69 Stiles St., Milford, CT (US) 06460; Nicholas Hanges, 7 Wildwood La., Salem, NH (US) 03079

( * ) Notice: Subject to any disclaimer, the term of this patent is extended or adjusted under 35 U.S.C. 154(b) by 391 days.

(21) Appl. No.: 11/123,825

(22) Filed: May 6, 2005

(65) Prior Publication Data

US 2005/0252798 A1  Nov. 17, 2005

Related U.S. Application Data

(60) Provisional application No. 60/568,634, filed on May 6, 2004.

(51) Int. Cl.
*B65D 85/57* (2006.01)
(52) U.S. Cl. .................. 206/308.1; 206/303
(58) Field of Classification Search ........... 206/303, 206/307, 308.1, 309, 311, 576; 211/41.1, 211/41.12
See application file for complete search history.

(56) References Cited

U.S. PATENT DOCUMENTS

| 5,090,561 | A | * | 2/1992 | Spector | 206/308.1 |
|---|---|---|---|---|---|
| 5,782,349 | A | * | 7/1998 | Combs | 206/308.1 |
| 5,791,467 | A | * | 8/1998 | Mahone | 206/308.1 |
| 2002/0162758 | A1 | * | 11/2002 | Clemens | 206/308.1 |
| 2003/0044559 | A1 | * | 3/2003 | Liu et al. | 428/40.1 |
| 2003/0062272 | A1 | * | 4/2003 | Gordon et al. | 206/232 |
| 2004/0055910 | A1 | * | 3/2004 | Boorman | 206/308.1 |
| 2004/0188287 | A1 | * | 9/2004 | Molnar et al. | 206/311 |
| 2005/0061687 | A1 | * | 3/2005 | Coppola | 206/217 |

* cited by examiner

*Primary Examiner*—David T. Fidei
(74) *Attorney, Agent, or Firm*—Holland & Bonzagni, P.C.; Mary R. Bonzagni, Esq.

(57) ABSTRACT

A flexible storage device that fits over, or is adherable to a surface of, the lid of a compact disk player for receiving and storing compact disks, as well as, portable compact disk players that employ such a flexible storage device, are provided. The inventive storage device serves to increase the functionality of a compact disk player by adding storage capacity, without interfering with the player's effective operation.

6 Claims, 1 Drawing Sheet

FLEXIBLE STORAGE DEVICE THAT FITS OVER (OR IS ADHERABLE TO A SURFACE OF) THE LID OF A PORTABLE COMPACT DISK PLAYER FOR RECEIVING AND STORING COMPACT DISKS AND PORTABLE COMPACT DISK PLAYERS EMPLOYING SAME

RELATED APPLICATION

This application claims priority from U.S. Provisional Patent Application Ser. No. 60/568,634, filed May 6, 2004.

FIELD OF THE INVENTION

This invention relates generally to a flexible storage device that fits over, or is adherable to a surface of, the lid of a compact disk player for receiving and storing compact disks, and to portable compact disk players that employ such a flexible storage device.

BACKGROUND OF THE INVENTION

Portable audio devices such as compact disk players have quickly gained popularity by providing an easier means for bringing these devices to picnics, on camping trips, or even to libraries. Unfortunately, these devices are designed to accommodate only one compact disk. As such, those wishing to listen to additional compact disks while picnicking, camping, or studying would need to separately transport additional compact disks in a separate storage/carrying case.

What is needed is a streamlined approach for transporting compact disks and portable compact disk players.

SUMMARY

The present invention therefore provides a flexible storage device that fits over, or is adherable to a surface of, the lid of a portable compact disk player for receiving and storing compact disks.

The present invention also provides a portable compact disk player that employs such a flexible storage device.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawings in which.

BEST MODE FOR CARRYING OUT THE INVENTION

Figure 1:
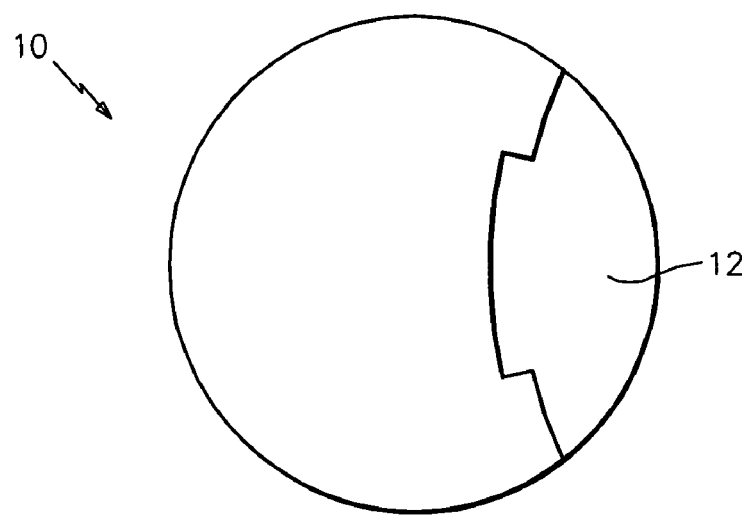
FIG. 1 is a bottom plan view of a preferred embodiment of the flexible storage device of the present invention.

The flexible storage device of the present invention, which fits over (or is adherable to a surface of) the lid or protective cover of a portable compact disk player, serves to increase the functionality of the player by adding storage capacity, without interfering with the player's effective operation.

In one embodiment, the flexible storage device fits over the lid or protective cover of a portable compact disk player and comprises: a plastic sleeve (e.g., an injection molded plastic sleeve) sized such that the internal diameter of the sleeve allows for a tight or precise fit; and one or more pockets formed on at least one outer surface of the plastic sleeve for receiving and storing compact disks. When assembled onto the lid, the sleeve has sufficient elasticity to allow a tight mechanical fit that will not easily come off of the lid.

In another embodiment, the flexible storage device is adapted to adhere to a surface of the lid or protective cover. More specifically, the storage device comprises: a plastic sheet material having opposing planar surfaces; one or more pockets formed on one surface of the plastic sheet material; and means for adhering an opposing surface of the plastic sheet material to a surface of the lid or protective cover of the portable compact disk player. In a preferred embodiment, the adhering means is an adhesive layer disposed on at least a portion of the opposing surface of the plastic sheet material.

Referring now to the drawings in detail, reference numeral 10 has been used to generally designate one embodiment of the flexible storage device of the present invention. Flexible storage device 10 is formed with one or more slots or pockets 12 for receiving and storing compact disks for play back on the rotary table of the portable compact disk player. The slots or pockets 12 can be positioned on one or opposing sides of device 10.

Flexible storage device 10 may also be formed with one or more perforations or holes (not shown) to accommodate the compact disk player's latching mechanisms. As is well known, portable compact disk players are manufactured with an "open" function actuator button. When the "open" mode is activated by depressing the button, the lid is released from the chassis or body of the player. The mechanism of the actuator button is configured entirely by mechanical means to release a catch that secures the lid in its closed position. The lid is advantageously spring loaded to automatically "open" the lid upon release and is advantageously hinged to the chassis or body of the player. In the "closed" position of the lid, the lid activates an electric switch that turns "ON" or activates the electric power to the entire portable player. In the "open" position of the lid, the lid disables this electric switch, thus turning off or deactivating electrical power to the entire player. Flexible storage device 10 is thus configured such that when mounted on (or adhered to) the lid, the perforations or holes can be aligned sufficiently with the catch or latching mechanism so as not to interfere with the proper operation of the player.

Flexible storage device 10 can adapt any shape or configuration depending upon the design of the portable compact disk player and the desired storage capacity. Moreover, storage device 10 may be formed of any flexible, polymeric material such as polyethylene, polypropylene, silicone rubber, polyurethane, or polyimide.

Figure 2:
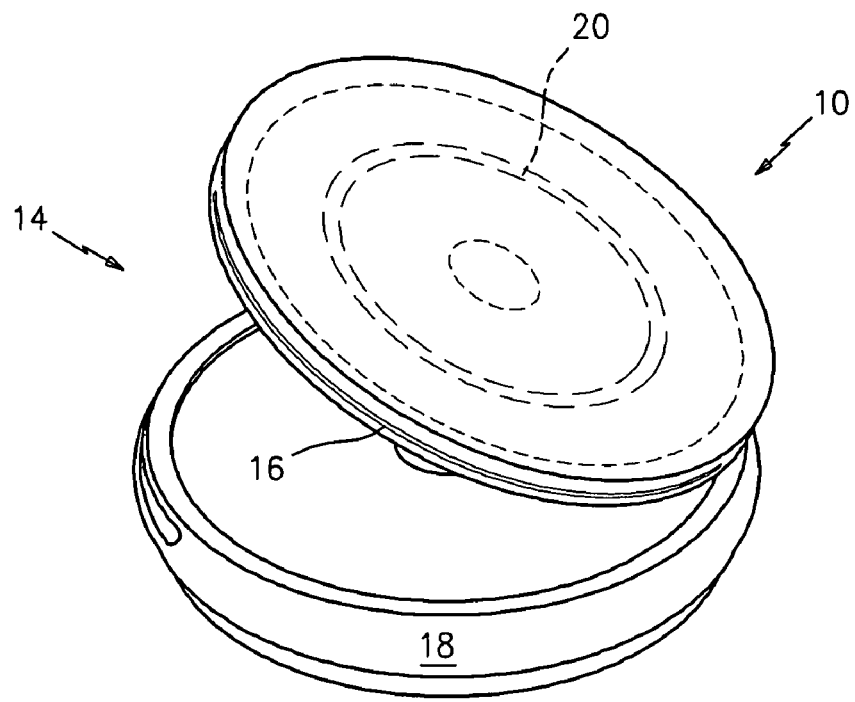
FIG. 2 is an aerial side view of a partially opened portable compact disk player having the inventive flexible storage device securely positioned on the lid or protective cover.

As is shown in FIG. 2, the portable compact disk player 14 of the present invention includes a lid or protective cover 16 and a chassis or body 18, with flexible storage device 10 securely positioned on the lid or protective cover 16, or adhered to a surface thereof by way of adhesive layer 20. As will be readily evident to those skilled in the art, the space between the lid 16 and the chassis 18 of player 14 may be increased to accommodate the storage of additional compact disks.

While various embodiments of the present invention have been described above, it should be understood that they have been presented by way of example only, and not limitation. Thus, the breadth and scope of the present invention should not be limited by any of the exemplary embodiments.

Having thus described the invention, what is claimed is:

1. A flexible storage device adapted to fit over a lid or protective cover of a portable compact disk player for receiving and storing one or more compact disks, which comprises: a plastic sleeve; and one or more pockets formed on at least one outer surface of the plastic sleeve for receiving and storing compact disks, wherein the plastic sleeve of the flexible storage device is adapted to fit over the lid or protective cover of the portable compact disk player.

2. A flexible storage device adapted to adhere to a surface of a lid or protective cover of a portable compact disk player for receiving and storing one or more compact disks, which comprises: a plastic sheet material having opposing planar surfaces that coextends with the surface of the lid or protective cover of the portable compact disk player; one or more pockets formed on one surface of the plastic sheet material for receiving and storing one or more compact disks; and means for adhering an opposing surface of the plastic sheet material to a surface of the lid or protective cover of the portable compact disk player.

3. The flexible storage device of claim 2, wherein the means for adhering an opposing surface of the plastic sheet material to a surface of the lid or protective cover of the portable compact disk player comprises an adhesive layer disposed on at least a portion of the opposing surface of the plastic sheet material.

4. A portable compact disk player having a lid or protective cover that employs a flexible storage device adapted to fit over the lid or protective cover for receiving and storing one or more compact disks, wherein the flexible storage device comprises: a plastic sleeve; and one or more pockets formed on at least one outer surface of the plastic sleeve for receiving and storing compact disks, wherein the plastic sleeve of the flexible storage device is adapted to fit over the lid or protective cover of the portable compact disk player.

5. A portable compact disk player having a lid or protective cover that employs a flexible storage device adapted to adhere to a surface of the lid or protective cover of the portable compact disk player for receiving and storing one or more compact disks, wherein the flexible storage device comprises: a plastic sheet material having opposing planar surfaces; one or more pockets formed on one surface of the plastic sheet material for receiving and storing one or more compact disks; and means for adhering an opposing surface of the plastic sheet material to a surface of the lid or protective cover of the portable compact disk player.

6. The portable compact disk player of claim 5, wherein the means for adhering an opposing surface of the plastic sheet material of the flexible storage device to a surface of the lid or protective cover of the portable compact disk player comprises an adhesive layer disposed on at least a portion of the opposing surface of the plastic sheet material.

* * * * *